United States Patent
Mutoh et al.

(10) Patent No.: US 9,538,711 B2
(45) Date of Patent: Jan. 10, 2017

(54) BACKPACK WORKING MACHINE

(71) Applicant: YAMABIKO CORPORATION, Tokyo (JP)

(72) Inventors: Hiroki Mutoh, Tokyo (JP); Yusuke Kinoshita, Tokyo (JP); Naoyuki Kirihara, Saitama (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 14/660,256

(22) Filed: Mar. 17, 2015

(65) Prior Publication Data

US 2015/0282435 A1 Oct. 8, 2015

(30) Foreign Application Priority Data

Apr. 3, 2014 (JP) ................................. 2014-076753

(51) Int. Cl.
*A01G 1/12* (2006.01)
*E01H 1/08* (2006.01)

(52) U.S. Cl.
CPC ............. *A01G 1/125* (2013.01); *E01H 1/0809* (2013.01)

(58) Field of Classification Search
CPC ..................................................... A01G 1/125
See application file for complete search history.

(56) References Cited

U.S. PATENT DOCUMENTS

| | | | | |
|---|---|---|---|---|
| 5,195,208 A * | 3/1993 | Yamami | ..................... | A47L 5/36 15/326 |
| 6,575,695 B1 * | 6/2003 | Miyamoto | ............. | A01G 1/125 15/326 |
| 6,928,693 B1 * | 8/2005 | Ericson | ................... | A01G 1/125 134/42 |
| 7,600,290 B1 * | 10/2009 | Peters | .................... | A01G 1/125 15/327.5 |
| 7,698,779 B2 | 4/2010 | Schliemann et al. | | |
| 8,177,914 B2 * | 5/2012 | Peters | .................. | E01H 1/0809 134/25.1 |
| 8,671,516 B1 * | 3/2014 | Mendez | ................. | A01G 1/125 15/327.5 |
| 8,789,237 B2 * | 7/2014 | Hatano | .................. | A01G 1/125 15/405 |
| 9,061,301 B2 * | 6/2015 | Bahr | ..................... | B05B 7/2475 |
| 9,167,751 B2 * | 10/2015 | Thackery | ............... | A01G 1/125 |

(Continued)

FOREIGN PATENT DOCUMENTS

| JP | S61-080360 | 5/1986 |
|---|---|---|
| JP | 2013-096337 A | 5/2013 |

*Primary Examiner* — Dung Van Nguyen (74) *Attorney, Agent, or Firm* — Lucas & Mercanti, LLP (57) ABSTRACT

Provided is a backpack working machine with excellent operability and durability, the machine having a configuration in which a blower is mounted on a backpack frame with a vibration isolation device interposed therebetween, and a drive source and a fuel tank are attached to the blower. The machine includes a backpack frame with a backrest portion, the backrest portion being adapted to abut an operator's back, a blower mounted on the backrest portion with a vibration isolation device interposed therebetween, an engine attached to the blower for driving the blower, and a fuel tank that stores a fuel to be supplied to the engine. The fuel tank is attached to the blower such that the fuel tank is located at at least one of a position below the engine or on a lateral side of the engine.

14 Claims, 7 Drawing Sheets

(56) References Cited

U.S. PATENT DOCUMENTS

2001/0005918 A1* 7/2001 Miyamoto ............... A47L 5/14
  15/326
2013/0108423 A1  5/2013 Kinoshita et al.

* cited by examiner

BACKPACK WORKING MACHINE

CLAIM OF PRIORITY

The present application claims priority from Japanese patent application JP 2014076753 filed on Apr. 3, 2014, the content of which is hereby incorporated by reference into this application.

BACKGROUND

Technical Field

The present invention relates to a backpack working machine, and for example, relates to a backpack air-blow working machine for performing a variety of operations by driving a blower with an engine to blow air while being carried on the operator's back.

Background Art

Conventionally, hand-guided air-blow working machines (for example, Patent Document 1) and backpack air-blow working machines (for example, Patent Document 2) are known as air-blow working machines for performing an operation of gathering fallen leaves, rubbishes, and the like by driving a blower with a drive source, such as an engine, to blow air.

Among the aforementioned air-blow working machines, the hand-guided air-blow working machine has a configuration in which a drive source for driving a blower for blowing air, a fuel tank that stores a fuel to be supplied to the drive source, and the like are integrally attached to the blower. Thus, the operator is able to perform the aforementioned operation while carrying the air-blow working machine by gripping a handle portion that is provided above the blower, for example.

Meanwhile, the backpack air-blow working machine typically has a configuration in which, as disclosed in Patent Document 2, a blower is mounted on a backpack frame with a vibration isolation device, such as a spring suspension, interposed therebetween, and a drive source for driving the blower is attached to the blower, and further, a fuel tank that stores a fuel to be supplied to the drive source is attached to the backpack frame. Thus, the operator is able to perform the aforementioned operation while carrying the air-blow working machine on his/her back with shoulder straps and the like that are provided on the backpack frame. As described above, in the conventional backpack air-blow working machine, the comfort of the operator who uses the air-blow working machine is improved and a load imposed on the vibration isolation device is reduced by mounting the drive source (i.e., engine) and the blower, which can be sources of vibration, on the backpack frame with the vibration isolation device interposed therebetween, while attaching the fuel tank, which is not a source of vibration, directly to the backpack frame, thereby reducing the weight of the constituent portion that is connected to the vibration isolation device attached to the backpack frame.

However, when the drive source is mounted on the backpack frame with the vibration isolation device interposed therebetween while the fuel tank is directly attached to the backpack frame, there is a problem in that the relative positions of the drive source and the fuel tank may change due to vibration and the like of the drive source when the drive source is in use (in particular, when the drive source starts to be used), for example, and thus, a load may be imposed on a fuel pipe for supplying a fuel from the fuel tank to the drive source.

To address such a problem, Patent Document 3 discloses a backpack air-blow working machine with a configuration in which a blower is mounted on a backpack frame with a vibration isolation device made of rubber interposed therebetween, and a drive source and a fuel tank are integrally attached to the rear surface of a fan casing of the blower.

RELATED ART DOCUMENTS

Patent Documents

Patent Document 1: U.S. Pat. No. 7,698,779 B
Patent Document 2: JP 2013-096337 A
Patent Document 3: JP S61-080360 U

SUMMARY

However, in the backpack air-blow working machine disclosed in Patent Document 3, the fuel tank is arranged above the drive source. Thus, when the operator performs an operation while carrying the backpack air-blow working machine on his/her back, a problem would arise such that the fuel tank and the fuel pipe may interfere with the outside object, and the center of gravity of the air-blow working machine becomes high, resulting in degraded stability, durability, and operability. In addition, as the fuel tank is arranged above the drive source, another problem would arise such that a thermal load imposed on the fuel pipe and the fuel tank may increase due to heat radiated from the drive source (i.e., engine) and a muffler when the drive source operates and stops.

The present invention has been made in view of the foregoing problems, and it is an object of the present invention to provide a backpack working machine with excellent operability and durability, the machine having a configuration in which a blower is mounted on a backpack frame with a vibration isolation device interposed therebetween, and a drive source and a fuel tank are attached to the blower.

In order to solve the above problem, the backpack working machine in accordance with the present invention includes a backpack frame with a backrest portion, the backrest portion being adapted to abut an operator's back; a blower mounted on the backrest portion with a vibration isolation device interposed therebetween; a drive source attached to the blower for driving the blower; and a fuel tank that stores a fuel to be supplied to the drive source. The fuel tank is attached to at least one of the blower or the drive source such that the fuel tank is located at at least one of a position below the drive source or on a lateral side of the drive source.

In a preferred embodiment, the fuel tank is attached such that at least one part of the fuel tank is located at a position below an intake system of the drive source.

In a further preferred embodiment, the fuel tank is attached such that a rear surface of the fuel tank is located on a more front side than a rear surface of a component, which is arranged at a rearmost position among components other than the fuel tank, when seen in a side view, and is located on an inner side of an external shape that is formed by the components other than the fuel tank when seen in a rear view.

In a still further preferred embodiment, the blower is connected in a cantilever manner to the backrest portion.

In a yet further preferred embodiment, the vibration isolation device includes a coil spring, and the blower and the backrest portion are connected with the coil spring.

In a yet further preferred embodiment, the backpack frame includes a bottom portion that extends from the backrest portion toward a portion below the blower, and the backpack working machine further includes a stopper mechanism for limiting a displacement of the blower with respect to the backpack frame.

In a yet further preferred embodiment, the stopper mechanism includes a first stopper mechanism, the first stopper mechanism having a part of a surface of a hole formed in the bottom portion and a part of a surface of the blower inserted into the hole.

In a yet further preferred embodiment, the hole is formed such that the hole penetrates the bottom portion.

In a yet further preferred embodiment, the first stopper mechanism has a surface on a rear surface side of the hole formed in the bottom portion and a rear surface of a first protrusion of the blower, the first protrusion being provided in a manner extending downward from the blower and inserted into the hole.

In a yet further preferred embodiment, the stopper mechanism includes a second stopper mechanism, the second stopper mechanism having a part of an upper surface of the bottom portion and a part of a surface of the blower that is opposite the part of the upper surface of the bottom portion.

In a yet further preferred embodiment, the second stopper mechanism has the part of the upper surface of the bottom portion and a lower surface of a second protrusion of the blower, the second protrusion being provided in a manner extending downward from the blower.

In a yet further preferred embodiment, the stopper mechanism includes a first stopper mechanism and a second stopper mechanism, the first stopper mechanism having a surface on a rear surface side of a hole formed in the bottom portion and a rear surface of a first protrusion of the blower, the first protrusion being provided in a manner extending downward from the blower and inserted into the hole, and the second stopper mechanism having a part of an upper surface of the bottom portion and a lower surface of a second protrusion of the blower, the second protrusion being provided in a manner extending downward from the blower.

In a yet further preferred embodiment, the first protrusion and the second protrusion are formed of the same protrusion or different protrusions.

In a yet further preferred embodiment, the second protrusion is arranged on an outer side of a center of the blower than the first protrusion.

According to the backpack working machine of the present invention, the fuel tank is attached to at least one of the blower or the drive source such that the fuel tank is located at at least one of a position below the drive source or on the lateral side of the drive source. Thus, when the operator performs an operation while carrying the backpack working machine on his/her back, the fuel tank and the fuel pipe become less likely to interfere with the outside object, and the center of gravity of the backpack working machine becomes low, resulting in improved stability. It is also possible to reduce a thermal load that is imposed on the fuel pipe and the fuel tank due to heat radiated from the drive source and the like when the drive source operates and stops, resulting in significantly increased durability and operability.

DETAILED DESCRIPTION OF THE EMBODIMENTS

Hereinafter, embodiments of a backpack working machine in accordance with the present invention will be described with reference to the drawings. It should be noted that examples of a backpack working machine, which performs a variety of operations by driving a blower with a drive source (i.e., engine) while the blower and the drive source are carried on the operator's back, include an air-blow working machine for gathering fallen leaves, rubbishes, and the like by blowing sucked air, a liquid chemical sprayer for mixing liquid chemicals in a blower and spraying them, a chemical duster for mixing powder-form chemicals in a blower and spraying them, and an sucking working machine for sucking rubbish and the like together with the outside air. Hereinafter, a backpack air-blow working machine will be specifically described among the aforementioned backpack working machines.

Figure 1:
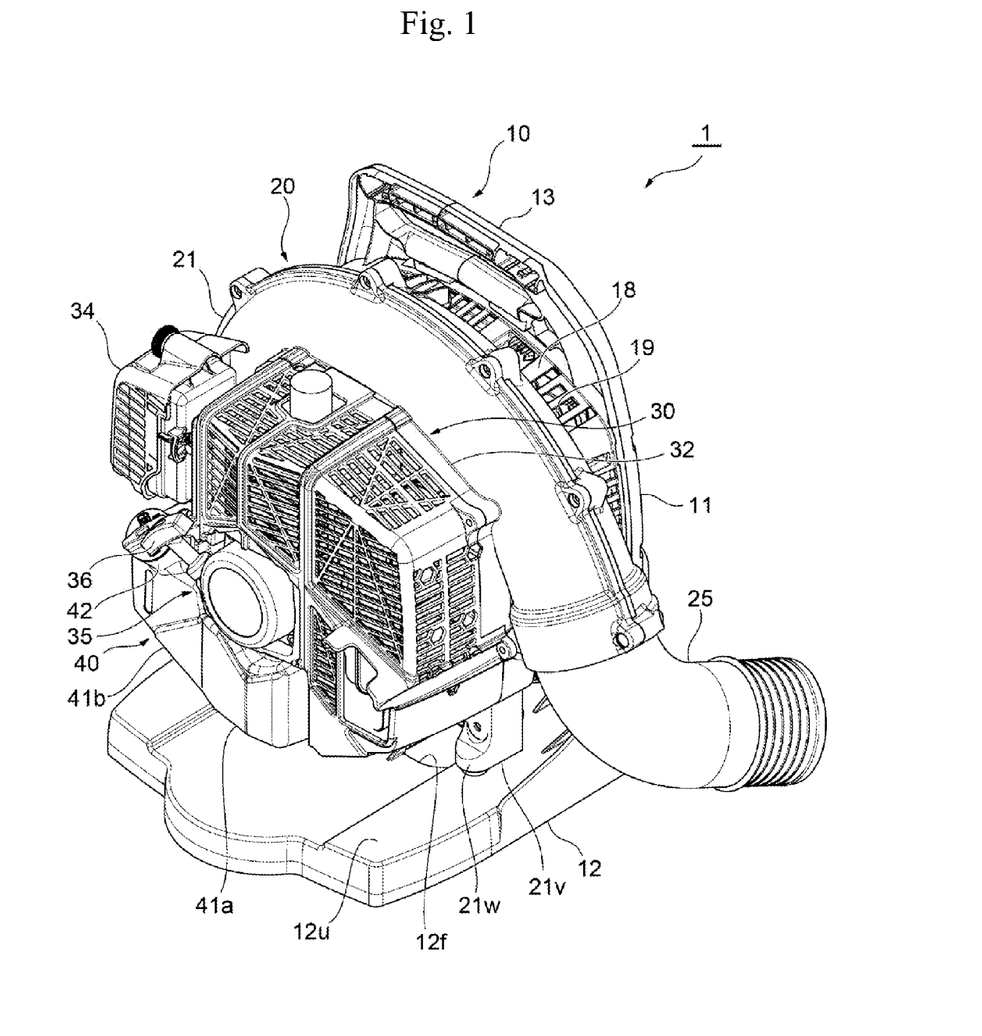
FIG. 1 is the overall perspective view of an embodiment of a backpack working machine in accordance with the present invention seen from left behind.
Figure 2:
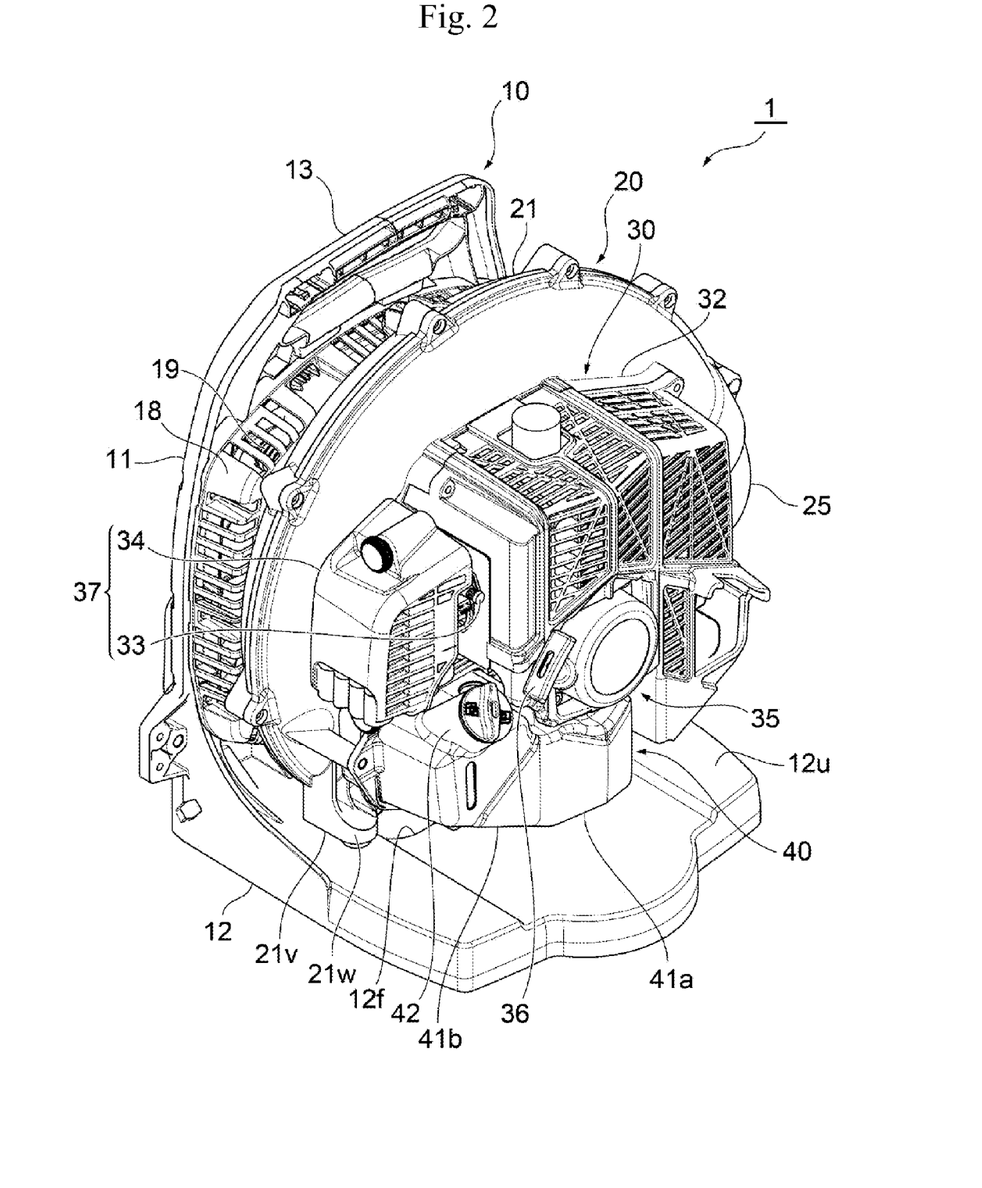
FIG. 2 is the overall perspective view of an embodiment of a backpack working machine in accordance with the present invention seen from right behind.
Figure 3:
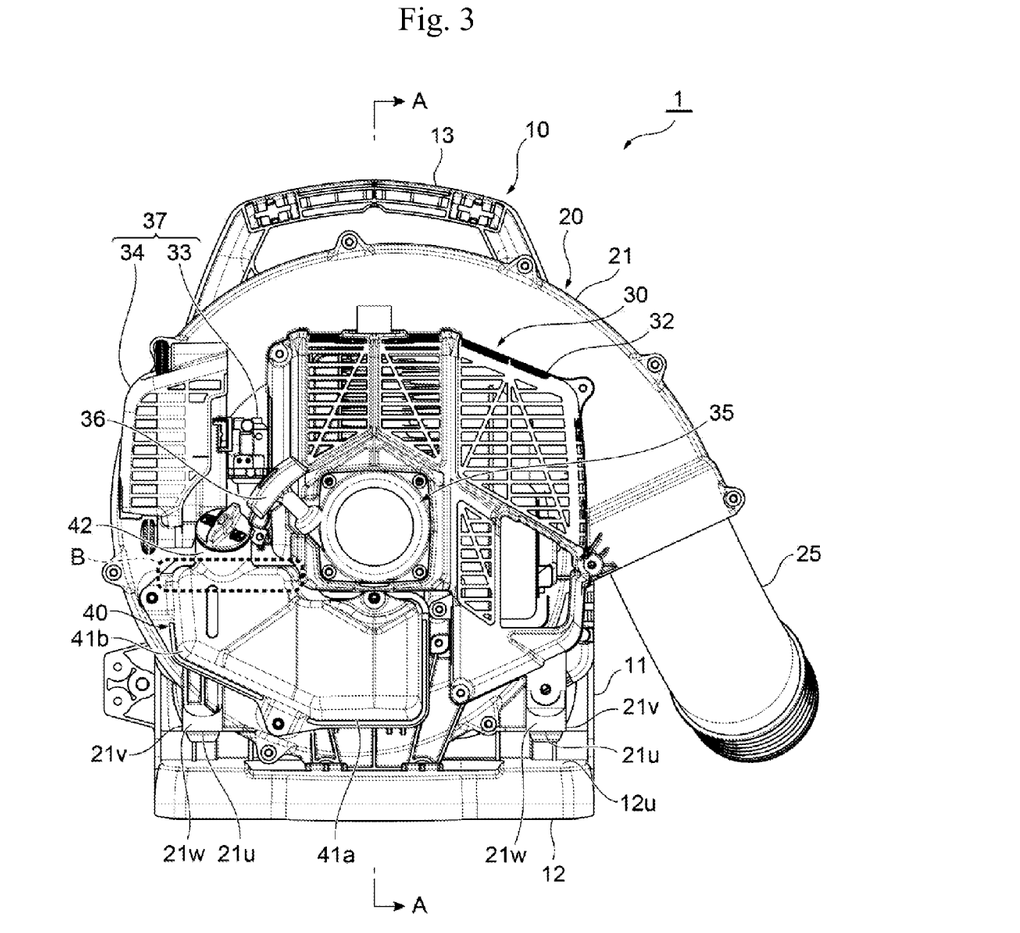
FIG. 3 is a rear view of the backpack working machine shown in FIG. 1.
Figure 4:
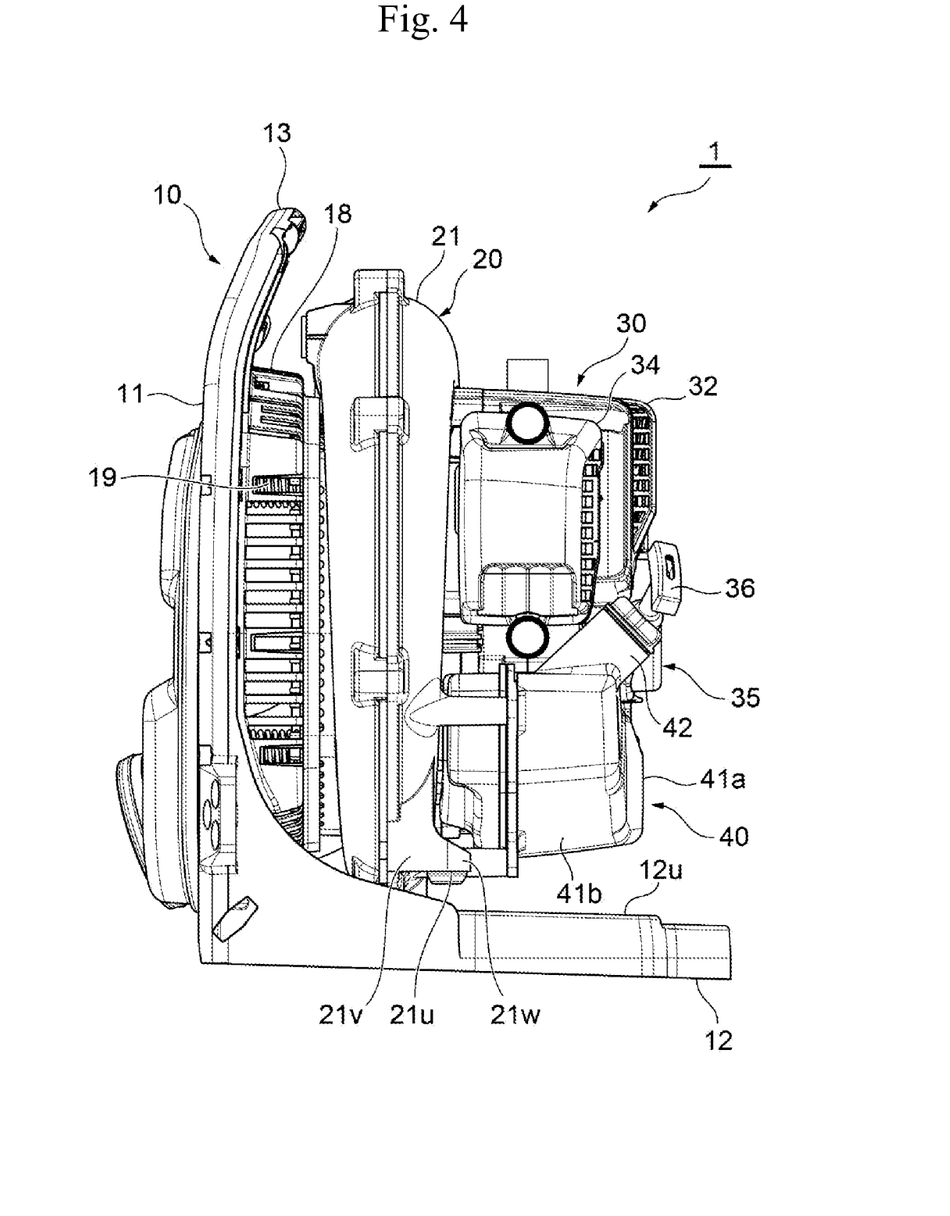
FIG. 4 is a right side view of the backpack working machine shown in FIG. 1.
Figure 5:
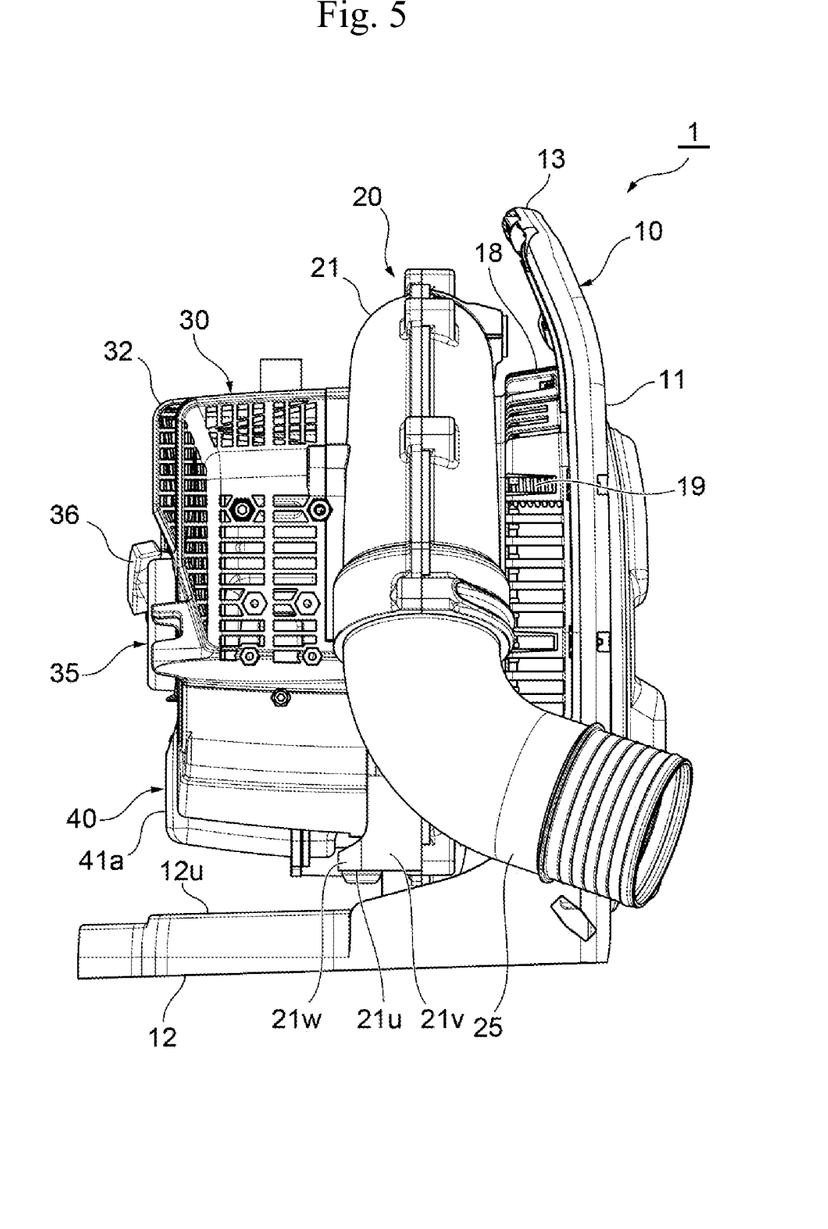
FIG. 5 is a left side view of the backpack working machine shown in FIG. 1.
Figure 6:
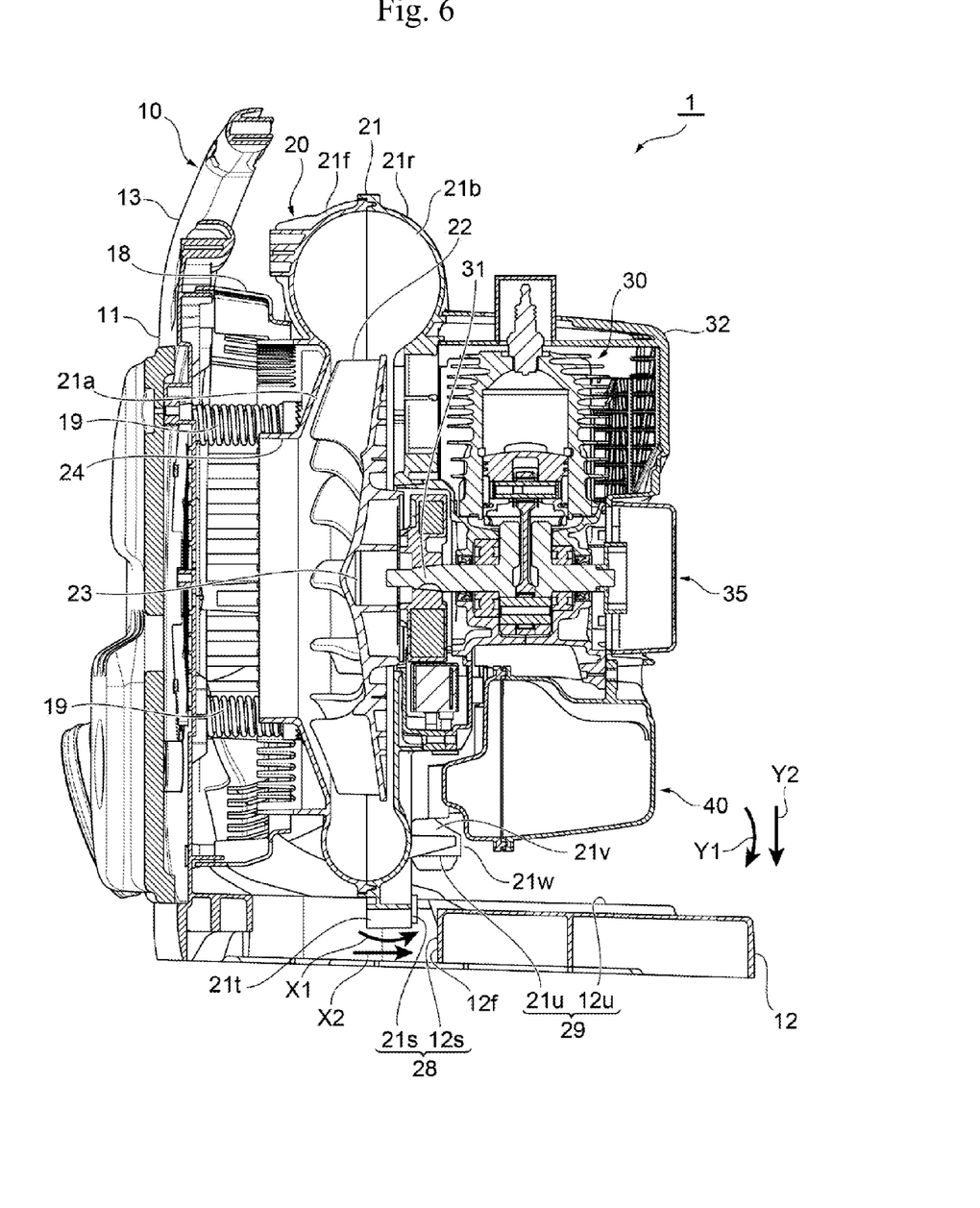
FIG. 6 is a sectional view taken in the direction of an arrow A-A in FIG. 3.
Figure 7:
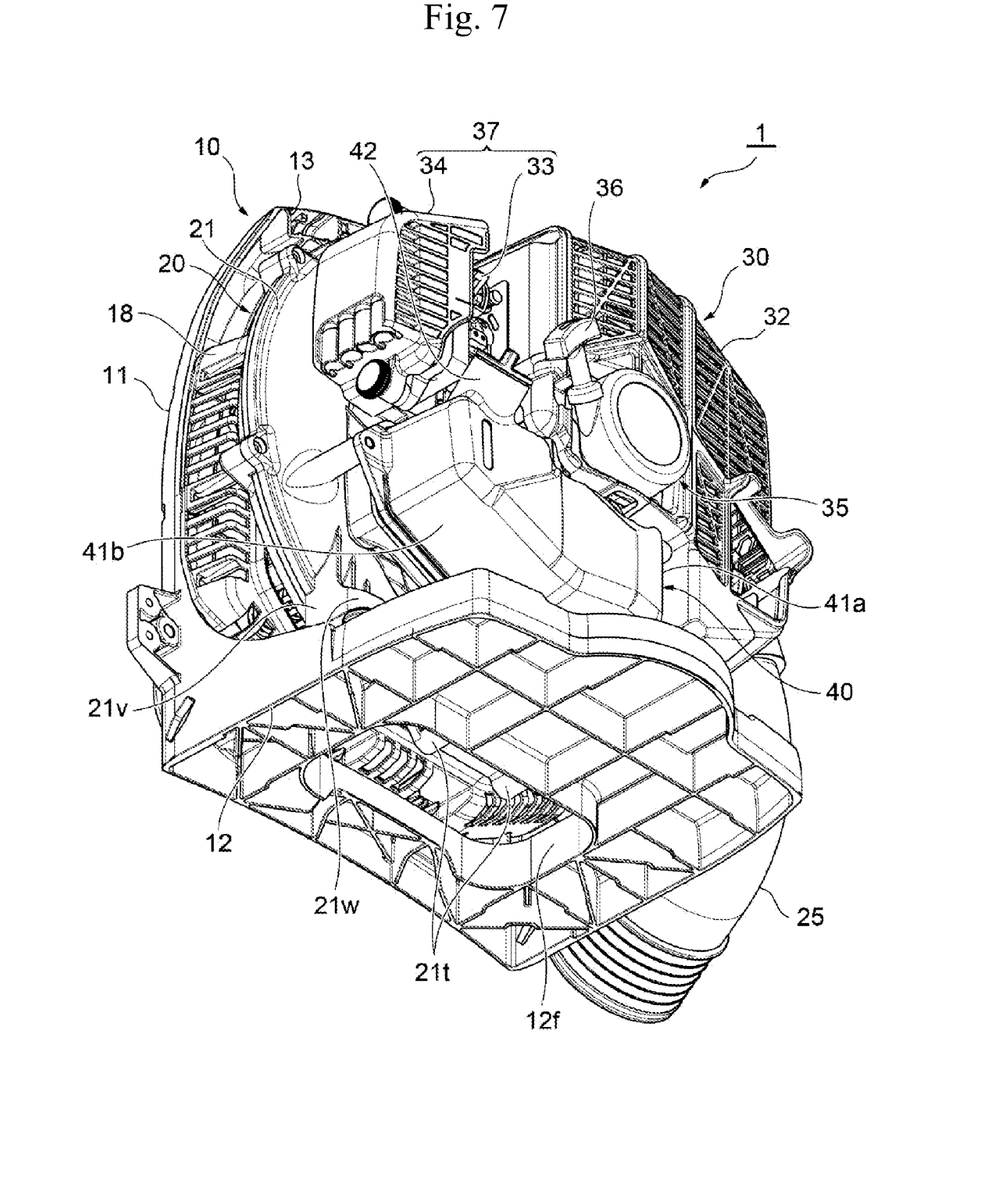
FIG. 7 is a perspective view of the backpack working machine shown in FIG. 1 seen from right behind and below.

FIGS. 1 and 2 are overall perspective views, seen from left behind and right behind, respectively, of an embodiment of a backpack air-blow working machine as the backpack working machine in accordance with the present invention. FIGS. 3 to 5 are a rear view, a right side view, and a left side view, respectively, of the backpack air-blow working machine shown in FIG. 1. FIG. 6 is a sectional view taken in the direction of an arrow A-A in FIG. 3. FIG. 7 is a perspective view of the backpack air-blow working machine shown in FIG. 1 seen from right behind and below.

A backpack air-blow working machine (hereinafter simply referred to as an air-blow working machine) 1 shown in the drawing mainly includes a backpack frame 10, which is formed so as to allow the operator to perform operations while carrying the machine on his/her back, a blower 20 mounted on the backpack frame 10, an engine (i.e., drive source) 30 for driving the blower 20, a fuel tank 40 for storing a fuel to be supplied to the engine 30, and a jet pipe (not shown) for injecting wind sent from the blower 20.

The backpack frame 10 is approximately L-shaped when seen in the side view, and mainly includes a flat backrest portion 11, which is approximately rectangular in shape and extends in an approximately perpendicular direction so as to abut the operator's back; a bottom portion 12, which is approximately rectangular in shape and extends backward in an approximately horizontal direction from the lower end of the backrest portion 11 for mounting the air-blow working machine 1 on the ground, a mount table, or the like; and a grip portion 13 that extends from the upper end of the backrest portion 11 slightly backward with respect to the perpendicular direction to allow the operator to carry the air-blow working machine 1. The backrest portion 11 includes a pair of right and left shoulder straps (not shown) so that the operator is able to carry the air-blow working machine 1 on his/her back by passing his/her arms through the shoulder straps. The front surface of the backrest portion 11 (i.e., surface on the side of the back of the operator who is carrying the backpack frame 10 on his/her back) is provided with a cushion or the like made of an elastic material such as urethane. An upper surface 12u of the bottom portion 12 is, as described in detail below, higher at its opposite (right and left) side portions than at the center portion across the front-back direction, and the center portion of the bottom portion 12 has formed therein a through-hole 12f that is approximately rectangular in shape when viewed in the plan view.

The blower 20 is mounted by being connected to the backrest portion 11 of the backpack frame 10 with a vibration isolation device (i.e., spring suspension) 19 having coil springs (a total of four coil springs including two, right and left coil springs×2 columns in the illustrated example) interposed therebetween. More specifically, the coil springs of the vibration isolation device 19 on the front end are connected to the backrest portion 11 of the backpack frame 10, while the coil springs of the vibration isolation device 19 on the rear end are connected to the blower 20 so that the blower 20 is connected in a cantilever manner only to the backrest portion 11 with the coil springs. It should be noted that the outer circumference of the vibration isolation device 19 that connects the blower 20 and the backpack frame 10 is covered with a cover 18 that has a plurality of through-holes arranged along the outer circumference thereof. The blower 20 and the backpack frame 10 are arranged with a predetermined gap therebetween. It should be noted that for the vibration isolation device 19, it is also possible to apply a device that has an appropriate vibration-absorbing member, such as rubber, instead of the coil springs.

The blower 20 mainly includes, as shown in FIG. 6, a fan casing 21, which is approximately circular in shape when seen in the rear view and is made of resin, and a fan 22 arranged in the fan casing 21. The fan 22 are rotatably supported by a fan shaft 23, which is fixed at approximately the center, and extends in an approximately horizontal direction, within the fan casing 21.

The fan casing 21 includes a fan accommodating chamber 21a that stores the fan 22, and an upper passage 21b that is formed above the fan accommodating chamber 21a so as to be in fluid communication with the fan accommodating chamber 21a. An air intake 24 is provided in the fan casing 21 on the side of the backpack frame 10, and the tip end of the upper passage 21b has connected thereto a main pipe 25 to which a jet pipe (not shown) is connected.

The engine 30 is attached in the vertically standing position to the rear surface of the fan casing 21 of the blower 20 (i.e., surface on the side opposite to the backrest portion 11 of the backpack frame 10) with a fastening member such as a bolt. As shown in FIG. 6, a crankshaft 31 of the engine 30 is connected to the fan shaft 23 of the blower 20. A recoil starter 35 is provided on the rear surface of the engine 30. The recoil starter 35 is adapted to, when a grip portion 36 thereof is pulled by the operator, have a magnet therein rotated and thus have a high voltage generated in the coil. Accordingly, the operator is able to start the engine 30 by manually operating the recoil starter 35. It should be noted that the engine 30 is covered with an engine cover 32 that has formed therein a plurality of slits for ventilation.

When the operator starts the engine 30 by operating the recoil starter 35 for starting an operation of gathering fallen leaves, rubbishes, and the like, the crankshaft 31 of the engine 30 rotates, so that the blower 20 is driven (i.e., the fan 22 are rotationally driven) via the fan shaft 23 connected to the crankshaft 31. When the blower 20 is driven, the outside air is sucked into the fan accommodating chamber 21a from the air intake 24 of the fan casing 21 via a space between the blower 20 and the backpack frame 10, so that the air is accelerated to a predetermined speed and pressurized to a predetermined pressure by the fan 22. The accelerated and pressurized air passes through the upper passage 21b from the fan accommodating chamber 21a of the fan casing 21, and flows into the jet pipe (not shown) from the main pipe 25 at the tip end of the upper passage 21b, and then blows out from the jet pipe.

A diaphragm-type carburetor 33 for supplying an atomized air-fuel mixture, which has been obtained by mixing a fuel with the air, to the engine 30, and an air cleaner 34 for cleaning the air taken into the carburetor 33, which constitute an intake system 37 of the engine 30, are sequentially attached to the right side of the engine 30 on the rear surface of the fan casing 21 of the blower 20 (or on the left side of the engine 30 when seen in the rear view as in FIGS. 2, 3, and 7). It should be noted that the intake system 37 (i.e., system for mixing a fuel stored in the fuel tank 40 with the outside air and supplying the mixture to a cylinder (i.e., combustion chamber) in the engine 30) includes, in addition to the air cleaner 34 and the diaphragm-type carburetor 33, an intake passage (not shown) for connecting the carburetor 33 and the cylinder in the engine 30.

The fuel tank 40 made of resin for the engine 30 is attached to the rear surface of the fan casing 21 of the blower 20 with a fastening member, such as a bolt, such that the fuel tank 40 is located at a position below and on the lateral side of the engine 30 and is also located at a position below the intake system 37 that includes the diaphragm-type carburetor 33, the air cleaner 34, and the like.

Specifically, the fuel tank 40 includes, as shown in FIG. 3, a left side portion 41a, which is located below the engine 30 and constitutes approximately the left half portion (or the right half portion when seen in the rear view of FIG. 3), and a right side portion 41b, which is located below the diaphragm-type carburetor 33 and the air cleaner 34 and constitutes approximately the right half portion. The right side portion 41b is located at a higher position than the left side portion 41a. Thus, the fuel tank 40 is arranged such that the left side portion 41a thereof is located below the engine 30, the right side portion 41b thereof is located below the diaphragm-type carburetor 33 and the air cleaner 34, and further, the upper end portion (i.e., a region B in FIG. 3) of the right side portion 41b is located on the lateral side of the engine 30. The lower end surface of the right side portion 41b of the fuel tank 40 is inclined such that it becomes lower toward the left side portion 41a, and has a smaller external shape than the fan casing 21 when seen in the rear view. It should be noted that an inlet 42 for filling a fuel is provided in a protruding manner at the upper end of the right side portion 41b of the fuel tank 40. The fuel tank 40 is arranged on the rear surface of the fan casing 21 of the blower 20 at the aforementioned position, and is attached to a plurality of bosses that extend backward from the rear surface of the fan casing 21 of the blower 20 via a plurality of attachment portions that are provided in a manner extending from the outer circumference of the fuel tank 40 toward the outer side (i.e., in the vertical and horizontal directions).

The fuel tank 40 has an external shape such that, as shown in FIGS. 4 and 5, the thickness in the front-back direction is substantially equal to or less than the thickness of the engine 30, and the thickness of the right side portion 41b is slightly smaller than that of the left side portion 41a.

That is, the fuel tank 40 is arranged such that the rear surface of the fuel tank 40 is located on a more front side than the rear surface of a component that is arranged at the rearmost position among the components other than the fuel tank 40 (in the illustrated example, the rear surface of the engine 30 or the recoil starter 35) when seen in the side view, and is arranged on the inner side of an external shape that is formed by the components other than the fuel tank 40 when seen in the rear view. Thus, the fuel tank 40 is arranged such that the fuel tank 40 is located on the inner side than the components other than the fuel tank 40 when seen in the side view and the rear view and is located between the engine 30 and the like and the bottom portion 12 of the backpack frame 10, so that the fuel tank 40 is protected by the engine 30 and the like and the bottom portion 12 of the backpack frame 10 in the vertical direction and the like. Thus, it is possible to reduce an external risk when the air-blow working machine 1 drops, for example.

It should be noted that the fuel tank 40 is connected to the diaphragm-type carburetor 33 of the intake system 37 that is attached to the right side of the engine 30 via a fuel pipe (not shown) so that a fuel in the fuel tank 40 can be supplied to the diaphragm-type carburetor 33 with a suction scheme.

In the air-blow working machine 1 in this embodiment, the fuel tank 40 is attached to the rear surface of the fan casing 21 of the blower 20 together with the engine 30 and the like, for example, so that a load on the fuel pipe is suppressed, the total length of the fuel pipe is reduced, and the exposed amount of the fuel pipe is reduced. In addition, as the fuel tank 40 is attached to the rear surface of the fan casing 21 of the blower 20 at a position below and on the lateral side of the engine 30 and the like, it becomes possible to, when the operator performs operations while carrying the air-blow working machine 1 on his/her back, make the fuel tank 40 and the fuel pipe less likely to interfere with the outside object, and lower the center of gravity of the air-blow working machine 1, which results in improved stability, and further reduce a thermal load that is imposed on the fuel pipe and the fuel tank 40 due to heat radiated from the engine 30 and the like when the engine 30 operates and stops. Further, as the fuel tank 40 is attached to the rear surface of the fan casing 21 of the blower 20, there is an advantage in that even when the operator wants to rest his/her foot on the bottom portion 12 of the backpack frame 10 in starting the engine 30 by operating the recoil starter 35, interference between the operator's foot and the fuel tank 40 is suppressed, and thus, the bottom portion 12 of the backpack frame 10 can be effectively used as a footrest. Meanwhile, as the weight of the constituent portion that is connected to the vibration isolation device 19 attached to the backpack frame 10 is increased, it is considered that displacement of the blower 20 and the like (for example, movement in the front-back direction, movement in the vertical direction, and tilt) with respect to the backpack frame 10 may increase when the operator carries the air-blow working machine 1 or performs operations (in particular, when starting the engine 30).

Thus, in this embodiment, the air-blow working machine 1 is provided with a stopper mechanism for limiting the displacement of the blower 20 with respect to the backpack frame 10.

Specifically, the fan casing 21 of the blower 20 includes a front portion 21f on the front surface side and a rear portion 21r on the rear surface side as shown in FIG. 6, and a protrusion (i.e., first protrusion) 21t (in the illustrated example, two protrusions that are arranged side-by-side) is provided in a manner extending downward from the lower end of the rear portion 21r. It should be noted that the right and left protrusions 21t are formed approximately symmetrically with respect to the perpendicular axis that passes through the center of the air-blow working machine 1. In addition, a portion, which corresponds to the protrusions 21t, of the bottom portion 12 of the backpack frame 10 that extends toward a portion below the blower 20 has formed therein a through-hole 12f that is approximately rectangular in shape when seen in the plan view as shown in FIGS. 6 and 7, so that the protrusions 21t are inserted into through-hole 12f. It should be noted that the through-hole 12f is formed in a region of from a position close to the backrest portion 11 to a position on a more front side than the front surface of the fuel tank 40 that is attached to the blower 20 in the plan view, so that the fuel tank 40 is surely protected by the bottom portion 12 of the backpack frame 10 at a position below the fuel tank 40.

When the blower 20 is tilted with respect to the backpack frame 10 by a predetermined angle or more (in particular, displaced in the direction of an arrow X1 in FIG. 6 around the axis line that extends in the horizontal direction) or when the blower 20 has moved backward with respect to the backpack frame 10 by a predetermined movement amount or more (moved in the direction of an arrow X2 in FIG. 6) while the operator is carrying the air-blow working machine 1 or performing operations (in particular, when starting the engine 30), a rear surface 21s of the protrusion 21t of the fan casing 21, which has been inserted into the through-hole 12f of the bottom portion 12, contacts/collides with a surface 12s on the rear surface side of the through-hole 12f. Accordingly, it is possible to prevent displacement of the blower 20 or the like, which is connected to the vibration isolation device 19, with respect to the backpack frame 10 by a predetermined amount or more. It should be noted that in this specification, a stopper mechanism that includes the rear surface 21s of the protrusion 21t of the fan casing 21 and the surface 12s on the rear surface side of the through-hole 12f described above will be referred to as a first stopper mechanism 28.

It should be noted that a buffer material made of urethane or the like for mitigating a shock upon occurrence of a contact/collision may also be fixed to the rear surface 21s of the protrusion 21t, which contacts/collides with the surface 12s of the through-hole 12f, with an adhesive or the like, for example.

Another protrusion (i.e., second protrusion) 21v (in the illustrated example, two protrusions) is provided in a manner extending downward on each of the outer sides of the right and left protrusions 21t of the rear portion 21r of the fan casing 21. It should be noted that the right and left protrusions 21v are formed approximately symmetrically with respect to the perpendicular axis that passes through the center of the air-blow working machine 1. In addition, each protrusion 21v is provided in a manner extending along the approximately perpendicular direction as shown in FIGS. 4 and 5, and has an overhanging portion 21w that overhangs backward at the lower end of the protrusion 21v so that an approximately L-shape is exhibited when seen in the side view. Usually, a lower surface 21u of the protrusion 21v is spaced apart from the upper surface 12u of the bottom portion 12 of the backpack frame 10.

When the blower 20 is tilted with respect to the backpack frame 10 by a predetermined angle or more (in particular, displaced in the direction of an arrow Y1 in FIG. 6 around the axis line that extends in the horizontal direction) or when the blower 20 has moved downward with respect to the backpack frame 10 by a predetermined movement amount or more (moved in the direction of an arrow Y2 in FIG. 6)

while the operator is carrying the air-blow working machine 1 or performing operations, the lower surface 21$u$ of the protrusion 21$v$ contacts/collides with the upper surface (i.e., upper surface around the through-hole 12$f$) 12$u$ of the bottom portion 12 of the backpack frame 10 located below the protrusion 21$v$. Accordingly, it is possible to prevent displacement of the blower 20 connected to the vibration isolation device 19 with respect to the backpack frame 10 by a predetermined amount or more. It should be noted that in this specification, a stopper mechanism that includes the lower surface 21$u$ of the protrusion 21$v$ and the upper surface 12$u$ of the bottom portion 12 described above will be referred to as a second stopper mechanism 29.

It should be noted that a buffer material made of urethane or the like for mitigating a shock upon occurrence of a contact/collision may also be fixed to, for example, the lower surface 21$u$ of the protrusion 21$v$ that contacts/collides with the upper surface 12$u$ of the bottom portion 12, in particular, the lower surface 21$u$ of a portion including the overhanging portion 21$w$ of the protrusion 21$v$.

Herein, the distance between the upper surface 12$u$ of the bottom portion 12 of the backpack frame 10 and the lower surface 21$u$ of the protrusion 21$v$ is set shorter than the distance between the lower surface of the bottom portion 12 and the lower end of the protrusion 21$t$ and the distance between the upper surface 12$u$ of the bottom portion 12 and the lower end of the fuel tank 40. That is, the distance is set so that, when the air-blow working machine 1 is put on the ground, a mount table, or the like, the protrusion 21$t$ of the fan casing 21 will not contact the ground or the mount table, and the fuel tank 40 will not contact the bottom portion 12 of the backpack frame 10.

It should be noted that the upper surface 12$u$ of the bottom portion 12 that contacts/collides with the bottom surface 21$u$ of the protrusion 21$v$, that is, the upper surface 12$u$ of the bottom portion 12 at the opposite (right and left) side portions is slightly higher than the upper surface of the center portion (i.e., a portion in which the through-hole 12$f$ is formed), and the overhanging portion 21$w$ that overhangs backward is provided at the lower end of the protrusion 21$v$ as described above so that when the blower 20 is displaced with respect to the backpack frame 10, the lower surface 21$u$ of the protrusion 21$v$ will contact/collide with the upper surface 12$u$ of the bottom portion 12 early.

Typically, vibration-absorbing members (i.e., coil springs) with a small elastic coefficient (i.e., spring coefficient) are used for the vibration isolation device 19 to improve the damping properties of the vibration isolation device 19 and improve the comfort of the operator. Even in such a case, providing the air-blow working machine 1 with a stopper mechanism can limit the displacement (e.g., the movement amount in the front-back direction, the movement amount in the vertical direction, and tilt) of the blower 20 with respect to the backpack frame 10 within a desired range. In addition, as described above, providing the air-blow working machine 1 with a stopper mechanism can, even when the fuel tank 40 is attached to the blower 20 together with the engine 30 and the like, and the weight of the constituent portion that is connected to the vibration isolation device 19 attached to the backpack frame 10 is thus increased, limit the displacement of the blower 20 with respect to the backpack frame 10 within the desired range.

It should be noted that the aforementioned first stopper mechanism 28 is not limited to the illustrated example, and may have a variety of configurations as long as the displacement of the blower 20 with respect to the backpack frame 10 can be limited. In addition, the shape, position, number, and the like of the protrusions 21$t$ that extend downward from the fan casing 21 may be designed appropriately. Further, a hole formed in the bottom portion 12 of the backpack frame 10 may be either a through-hole or not a through-hole. In addition, the shape, position, number, and the like of the holes formed in the bottom portion 12 of the backpack frame 10 may be designed appropriately. However, by forming the through-hole 12$f$ in the bottom portion 12 of the backpack frame 10 for putting the air-blow working machine 1 on the ground or the like and protecting the fuel tank 40 and by inserting the protrusions 21$t$, which are parts of the fan casing 21 of the blower 20, into the through-hole 21$f$ as described above, it is possible to effectively suppress the height of the air-blow working machine 1 in the vertical direction. Thus, it is possible to reduce the size of the air-blow working machine 1 while lowering the center of gravity of the air-blow working machine 1, thereby ensuring high stability and increased operability. Meanwhile, forming the through-hole 12$f$ in the bottom portion 12 of the backpack frame 10 and inserting the protrusions 21$t$, which are parts of the fan casing 21 of the blower 20, into the through-hole 12$f$ has another advantage in that the unity in terms of design of the air-blow working machine 1 is improved and the aesthetic appearance of the entire air-blow working machine 1 is enhanced.

In addition, the aforementioned second stopper mechanism 29 is not limited to the illustrated example, and may have a variety of configurations as long as the displacement of the blower 20 with respect to the backpack frame 10 can be limited. In addition, the shape, position, number, and the like of the protrusions 21$v$ that extend downward from the fan casing 21 can be designed appropriately. However, by making the protrusions 21$v$, which are parts of the fan casing 21 of the blower 20, to contact/collide with the bottom portion 12 of the backpack frame 10 for putting the air-blow working machine 1 on the ground or the like and protecting the fuel tank 40 as described above, it is possible to surely regulate the displacement of the blower 20 with respect to the backpack frame 10. For example, it is possible to surely avoid contact between the protrusions 21$t$ of the fan casing 21 and the ground, a mount table, or the like when the air-blow working machine 1 is put on the ground, the mount table, or the like, and surely avoid contact between the bottom portion 12 of the backpack frame 10 and the fuel tank 40.

In addition, as described above, arranging the protrusions 21$v$ of the fan casing 21 of the blower 20, which partially constitute the second stopper mechanism 29, at positions on the outer side of the center of the blower 20 than the protrusions 21$t$, which partially constitute the first stopper mechanism 28, has an advantage in that the configuration of the fan casing 21 of the blower 20 can be simplified and the weight thereof can be reduced.

In the aforementioned embodiment, the first stopper mechanism 28 and the second stopper mechanism 29 are separate, independent mechanisms. That is, the protrusions (i.e., first protrusions) 21$t$ that partially constitute the first stopper mechanism 28 and the protrusions (i.e., second protrusions) 21$v$ that partially constitute the second stopper mechanism 29 are formed of different protrusions. However, the protrusions (i.e., first protrusions) 21$t$ that partially constitute the first stopper mechanism 28 and the protrusions (i.e., second protrusions) 21$v$ that partially constitute the second stopper mechanism 29 may also be formed of the same protrusions, that is, the first stopper mechanism 28 may combine the function of the second stopper mechanism 29. For example, a configuration may be provided in which protrusions (i.e., protrusions that combine the functions of the first protrusions and the second protrusions) are provided in a manner extending downward from the lower end of the fan casing 21 of the blower 20 so that the rear surfaces of the protrusions will contact/collide with a part of the surface of the bottom portion 12 of the backpack frame 10, while the lower surfaces of the protrusions will contact/collide with a part of the surface (upper surface) of the bottom portion 12 of the backpack frame 10.

As described above, according to the backpack air-blow working machine 1 in this embodiment, the fuel tank 40 for storing a fuel to be supplied to the engine 30 is attached to the blower 20 together with the engine 30 and the like such that the fuel tank 40 is located at a position below and on the lateral side of the engine 30 and the like. Thus, it is possible to, when the operator performs an operation while carrying the air-blow working machine 1 on his/her back, make the fuel tank 40 and the fuel pipe less likely to interfere with the outside object, and lower the center of gravity of the air-blow working machine 1, thereby improving the stability and reducing a thermal load that is imposed on the fuel pipe and the fuel tank 40 due to heat radiated from the engine 30 and the like when the engine 30 operates and stops, resulting in significantly enhanced durability and operability. Further, as the fuel tank 40 is attached to the blower 20, it is possible for the operator to, when resting his/her foot on the bottom portion 12 of the backpack frame 10 to start the engine 30 by operating the recoil starter 35, effectively use the bottom portion 12 of the backpack frame 10 as a footrest.

In addition, as the fuel tank 40 is attached to the blower 20 such that the fuel tank 40 is located below the intake system 37, which includes the air cleaner 34, the diaphragm-type carburetor 33, and an intake passage leading to the cylinder (i.e., combustion chamber) of the engine 30, the fuel pipe that connects the carburetor 33 and the fuel tank 40 is surely protected. Thus, the durability is surely increased.

In addition, as a stopper mechanism, such as the first stopper mechanism and the second stopper mechanism for limiting the displacement (e.g., the movement amount in the front-back direction, the movement amount in the vertical direction, and tilt) of the blower 20 with respect to the backpack frame 10, is provided, it is possible to ensure the durability of the fan casing 21 of the blower 20, the vibration isolation device 19, the fuel tank 40, and the like even when a vibration-absorbing member with a small elastic coefficient is used for the vibration isolation device 19, or the fuel tank 40 is attached to the blower 20 that is connected in a cantilever manner to the backpack frame 10 via the vibration isolation device 19.

Although the aforementioned embodiment illustrates an embodiment in which a part of the fuel tank 40 is arranged below the engine 30, and a portion (a region B in FIG. 3) other than the part of the fuel tank 40 is arranged on the lateral side of the engine 30, the fuel tank 40 may also be attached to the fan casing 21 of the blower 20 such that the entire fuel tank 40 is located below or on the lateral side of the engine 30.

In addition, although the aforementioned embodiment illustrates a configuration in which the fuel tank 40 is fastened and fixed only to bosses provided on the blower 20, it is needless to mention that the fuel tank 40 may also be partly or entirely attached to other components that are attached to the blower 20, such as the engine 30 or the air cleaner 34.

Further, although the aforementioned embodiment illustrates an example in which the fuel tank 40 and the like are attached to the fan casing 21 of the blower 20 with a fastening member such as a bolt, it is needless to mention that the attachment configuration of the fuel tank 40 and the like with respect to the blower 20 may be changed as appropriate.

DESCRIPTION OF SYMBOLS

1 Backpack air-blow working machine (backpack working machine)
10 Backpack frame
11 Backrest portion
12 Bottom portion
12*f* Through-hole
12*s* Surface on the rear surface side of through-hole
12*u* Upper surface of bottom portion
13 Grip portion
18 Cover
19 Vibration isolation device
20 Blower
21 Fan casing
21*f* Front portion of fan casing
21*r* Rear portion of fan casing
21*s* Rear surface of protrusion
21*t* Protrusion (first protrusion)
21*u* Lower surface of protrusion
21*v* Protrusion (second protrusion)
21*w* Overhanging portion
22 Fan
23 Fan shaft
24 Air intake
28 First stopper mechanism
29 Second stopper mechanism
30 Engine (drive source)
31 Crankshaft
32 Engine cover
33 Diaphragm-type carburetor
34 Air cleaner
35 Recoil starter
36 Grip portion
37 Intake system
40 Fuel tank
41*a* Left-side portion
41*b* Right-side portion
42 Inlet

What is claimed is:

1. A backpack working machine comprising:
   a backpack frame with a backrest portion that is adapted to abut an operator's back;
   a blower mounted on the backrest portion with a vibration isolation device interposed therebetween;
   a drive source attached to the blower for driving the blower; and
   a fuel tank that stores a fuel to be supplied to the drive source, wherein
   the fuel tank is attached to both the blower and the drive source such that the fuel tank is located at least one of a position below the drive source or on a lateral side of the drive source.

2. The backpack working machine according to claim 1, wherein the fuel tank is attached such that at least one part of the fuel tank is located at a position below an intake system of the drive source.

3. The backpack working machine according to claim 1, wherein the fuel tank is attached such that a rear surface of the fuel tank is located on a more front side than a rear surface of a component, which is arranged at a rearmost position among components other than the fuel tank, when seen in a side view, and is located on an inner side of an external shape that is formed by the components other than the fuel tank when seen in a rear view.

4. The backpack working machine according to claim 1, wherein the blower is connected in a cantilever manner to the backrest portion.

5. The backpack working machine according to claim 1, wherein
the vibration isolation device includes a coil spring, and
the blower and the backrest portion are connected with the coil spring.

6. The backpack working machine according to claim 1, wherein
the backpack frame includes a bottom portion that extends from the backrest portion toward a portion below the blower, and
the backpack working machine further comprises a stopper mechanism for limiting a displacement of the blower with respect to the backpack frame.

7. The backpack working machine according to claim 6, wherein the stopper mechanism includes a first stopper mechanism, the first stopper mechanism having a part of a surface of a hole formed in the bottom portion and a part of a surface of the blower inserted into the hole.

8. The backpack working machine according to claim 7, wherein the hole is formed such that the hole penetrates the bottom portion.

9. The backpack working machine according to claim 7, wherein the first stopper mechanism has a surface on a rear surface side of the hole formed in the bottom portion and a rear surface of a first protrusion of the blower, the first protrusion being provided in a manner extending downward from the blower and inserted into the hole.

10. The backpack working machine according to claim 6, wherein the stopper mechanism includes a second stopper mechanism, the second stopper mechanism having a part of an upper surface of the bottom portion and a part of a surface of the blower that is opposite the part of the upper surface of the bottom portion.

11. The backpack working machine according to claim 10, wherein the second stopper mechanism has the part of the upper surface of the bottom portion and a lower surface of a second protrusion of the blower, the second protrusion being provided in a manner extending downward from the blower.

12. The backpack working machine according to claim 6, wherein the stopper mechanism includes a first stopper mechanism and a second stopper mechanism, the first stopper mechanism having a surface on a rear surface side of a hole formed in the bottom portion and a rear surface of a first protrusion of the blower, the first protrusion being provided in a manner extending downward from the blower and inserted into the hole, and the second stopper mechanism having a part of an upper surface of the bottom portion and a lower surface of a second protrusion of the blower, the second protrusion being provided in a manner extending downward from the blower.

13. The backpack working machine according to claim 12, wherein the first protrusion and the second protrusion are formed of the same protrusion or different protrusions.

14. The backpack working machine according to claim 12, wherein the second protrusion is arranged on an outer side of a center of the blower than the first protrusion.

* * * * *